(12) United States Patent
Codrescu

(10) Patent No.: US 7,913,255 B2
(45) Date of Patent: Mar. 22, 2011

(54) BACKGROUND THREAD PROCESSING IN A MULTITHREAD DIGITAL SIGNAL PROCESSOR

(75) Inventor: Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1493 days.

(21) Appl. No.: 11/256,350

(22) Filed: Oct. 20, 2005

(65) Prior Publication Data

US 2007/0094660 A1  Apr. 26, 2007

(51) Int. Cl.
*G06F 9/46* (2006.01)
*G06F 13/24* (2006.01)
*G06F 9/00* (2006.01)

(52) U.S. Cl. ........ 718/101; 718/108; 710/262; 712/224; 712/237

(58) Field of Classification Search ........... 718/108; 710/262
See application file for complete search history.

(56) References Cited

U.S. PATENT DOCUMENTS

| | | | |
|---|---|---|---|
| 4,494,189 A * | 1/1985 | Bean et al. | 718/107 |
| 4,901,307 A | 2/1990 | Gilhousen et al. | |
| 5,103,459 A | 4/1992 | Gilhousen et al. | |
| 5,907,702 A * | 5/1999 | Flynn et al. | 718/108 |
| 6,032,245 A * | 2/2000 | Georgiou et al. | 712/23 |
| 6,134,710 A | 10/2000 | Levine et al. | |
| 6,567,839 B1 | 5/2003 | Borkenhagen et al. | |
| 6,845,419 B1 | 1/2005 | Moyer | |
| 7,020,879 B1 * | 3/2006 | Nemirovsky et al. | 718/107 |
| 7,120,718 B2 * | 10/2006 | Pezzini | 710/265 |
| 2002/0002667 A1 | 1/2002 | Kelsey et al. | |
| 2005/0050305 A1 | 3/2005 | Kissell | |
| 2005/0102458 A1 | 5/2005 | Ober et al. | |

OTHER PUBLICATIONS

International Search Report-PCT/US06/060132, International Search Authority-European Patent Office-Mar. 30, 2007.
Written Opinion-PCT/US06-060132, International Search Authority-European Patent Office-Mar. 30, 2007.

* cited by examiner

*Primary Examiner* — Emerson C Puente
*Assistant Examiner* — Camquy Truong
(74) *Attorney, Agent, or Firm* — Peter M. Kamarchik; Nicholas J. Pauley; Jonathan T. Velasco

(57) ABSTRACT

Techniques for the design and use of a digital signal processor, including processing transmissions in a communications (e.g., CDMA) system. The disclosed method and system provide background thread processing in a multithread digital signal processor for backgrounding and other background operations. The method and system form a background thread interrupt as one of a plurality of interrupt types, the background thread interrupt initiates a low-priority background process using one of a plurality of processing threads of a multithread digital signal processor. The process includes storing the background thread interrupt in an interrupt register and a background processing mask for associating with a processing thread of the multithread digital signal processor, which associates with at least a subset of said plurality of processing threads. Upon sensing a cache miss in one of the processing threads during multithread processing, the interrupt register issues the background thread interrupt and the digital signal processor initiates background processing using one of the processing threads having an associated background processing mask.

24 Claims, 6 Drawing Sheets

BACKGROUND THREAD PROCESSING IN A MULTITHREAD DIGITAL SIGNAL PROCESSOR

FIELD

The disclosed subject matter relates to data communications. More particularly, this disclosure relates to a novel and improved background thread processing method and system for a multithread digital signal processor.

DESCRIPTION OF THE RELATED ART

Increasingly, electronic equipment and supporting software applications involve signal processing. Home theatre, computer graphics, medical imaging and telecommunications all rely on signal-processing technology. Signal processing requires fast math in complex, but repetitive algorithms. Many applications require computations in real-time, i.e., the signal is a continuous function of time, which must be sampled and converted to digital, for numerical processing. The processor must thus execute algorithms performing discrete computations on the samples as they arrive. The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communication between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more telecommunications, and now streaming video, standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3$^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard. There are also video compression standards, such as MPEG-1, MPEG-2, MPEG-4, H.263, and WMV (Windows Media Video), as well as many others that such wireless handsets will increasingly employ.

For many of these devices, a fully software-based solution is highly desirable. Given that compression standards are always evolving and new standards are always emerging, developers are looking toward DSPs to quickly implement these standards. The DSP, however, exhibits certain limitations, especially ones relating to the characteristics of available memory.

Compression standards are not generally known for including mathematically complex algorithms, so the major problems facing developers attempting to port video-compression standards onto a telecommunications or other DSP platform involve the restrictive data flow, limited bandwidth, and excessive latency of memory.

One type of DSP that may provide significant processing capability uses multithreading of a number of signal processing threads associated with a single processor core. As these processors gain speed and power, and instruction sets ideal for video-processing applications complement them, real-time encoding of video sequences becomes easier. With a fast processor and much data to process, the DSP's memory architecture may severely limit real-time encoding and related operations. With limited fast internal memory and limited bandwidth to external memory, a bottleneck often appears between the processor and the data.

Accordingly, there is a need for a method and system of overcome memory latency in a DSP or similar signal processing environment.

Moreover, a need exists for a method and system for operating a multithreaded DSP with reduced load latency for telecommunications and other applications.

SUMMARY

Techniques for providing a background thread processing method and system for a multithread digital signal processor are disclosed, which techniques improve both the operation of a digital signal processor and the efficient use of digital signal processor instructions for processing increasingly robust software applications for personal computers, personal digital assistants, wireless handsets, and similar electronic devices, as well as increasing the associated digital processor speed and service quality.

According to one aspect of the disclosed subject matter, there is provided Techniques for the design and use of a digital signal processor, including processing transmissions in a communications (e.g., CDMA) system. The disclosed method and system provide background thread processing in a multithread digital signal processor for backgrounding and other background operations. The method and system form a background thread interrupt as one of a plurality of interrupt types, the background thread interrupt initiates a low-priority background process using one of a plurality of processing threads of a multithread digital signal processor. The process includes storing the background thread interrupt in an interrupt register and a background processing mask for associating with a processing thread of the multithread digital signal processor, which associates with at least a subset of said plurality of processing threads. Upon sensing an event, such as a cache miss, in one of the processing threads during multithread processing, the interrupt register issues the background thread interrupt and the digital signal processor initiates background processing using one of the processing threads having an associated background processing mask. A computer usable medium having computer readable program code means embodied therein to perform background processing in a multithreaded digital signal processor.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
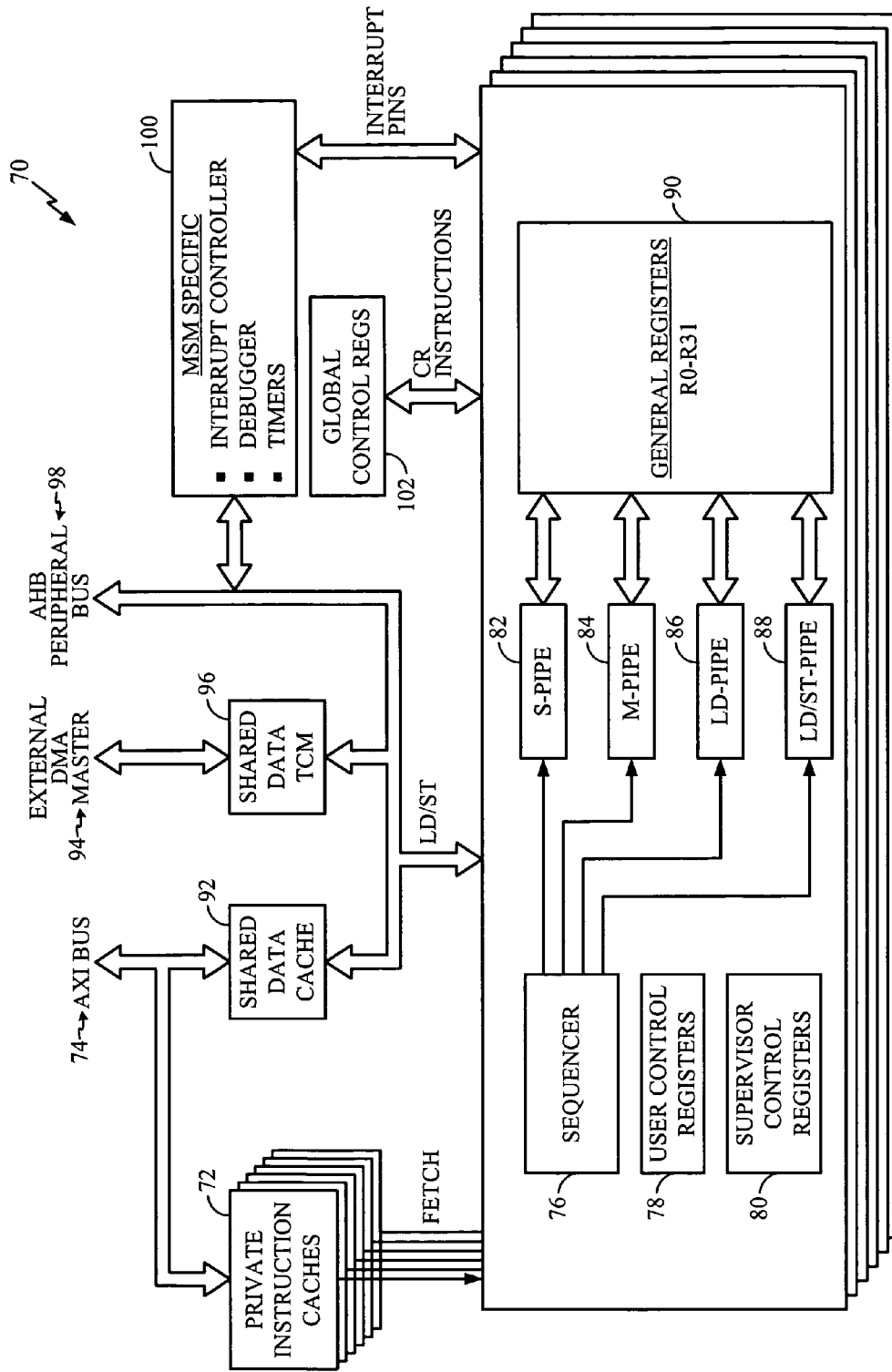
Figure 4:
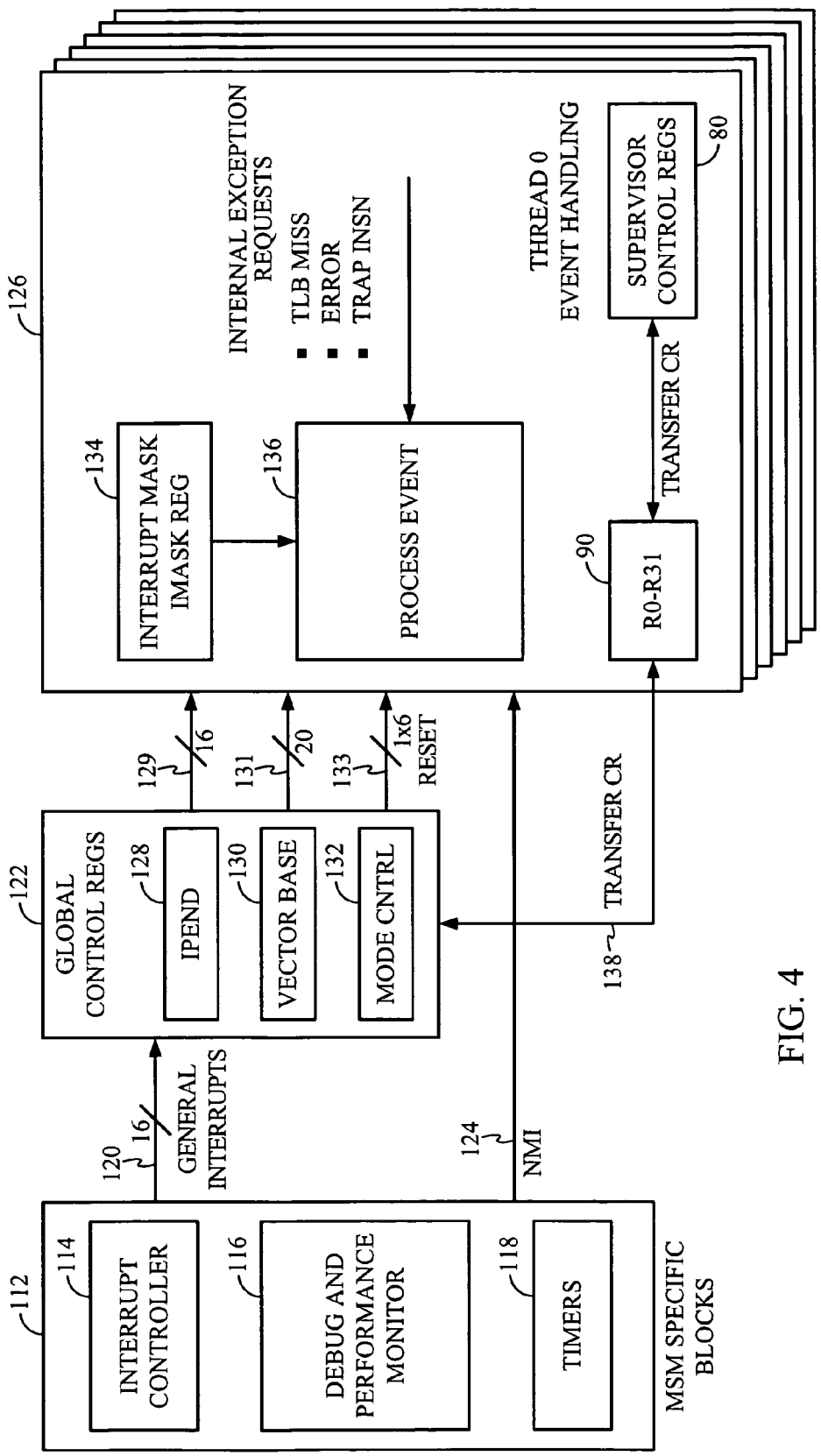
Figure 5:
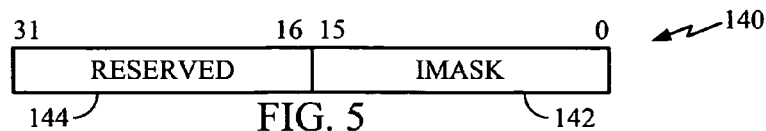
Figure 6:
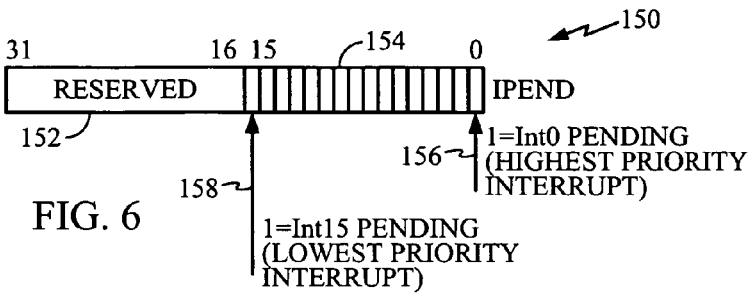
Figure 7:
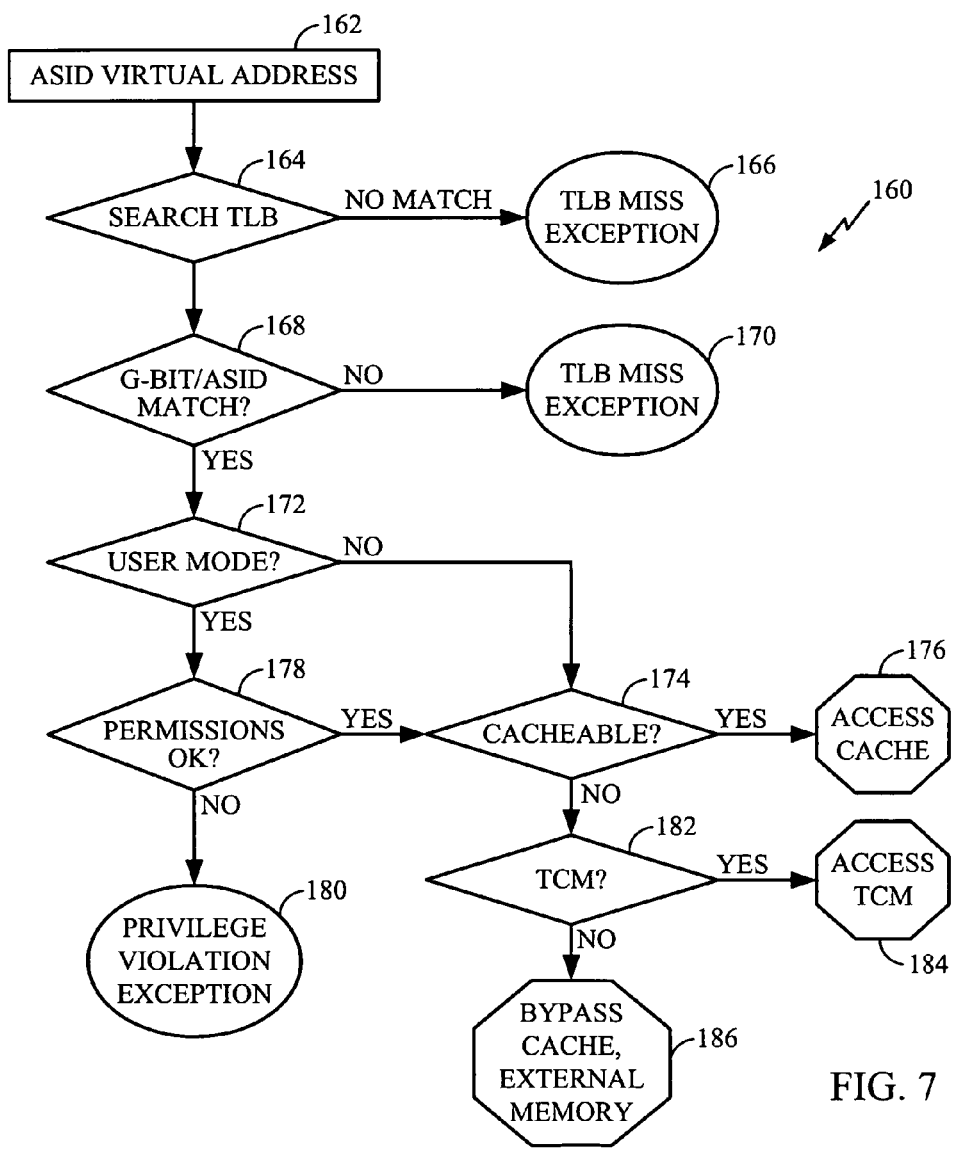
Figure 8:
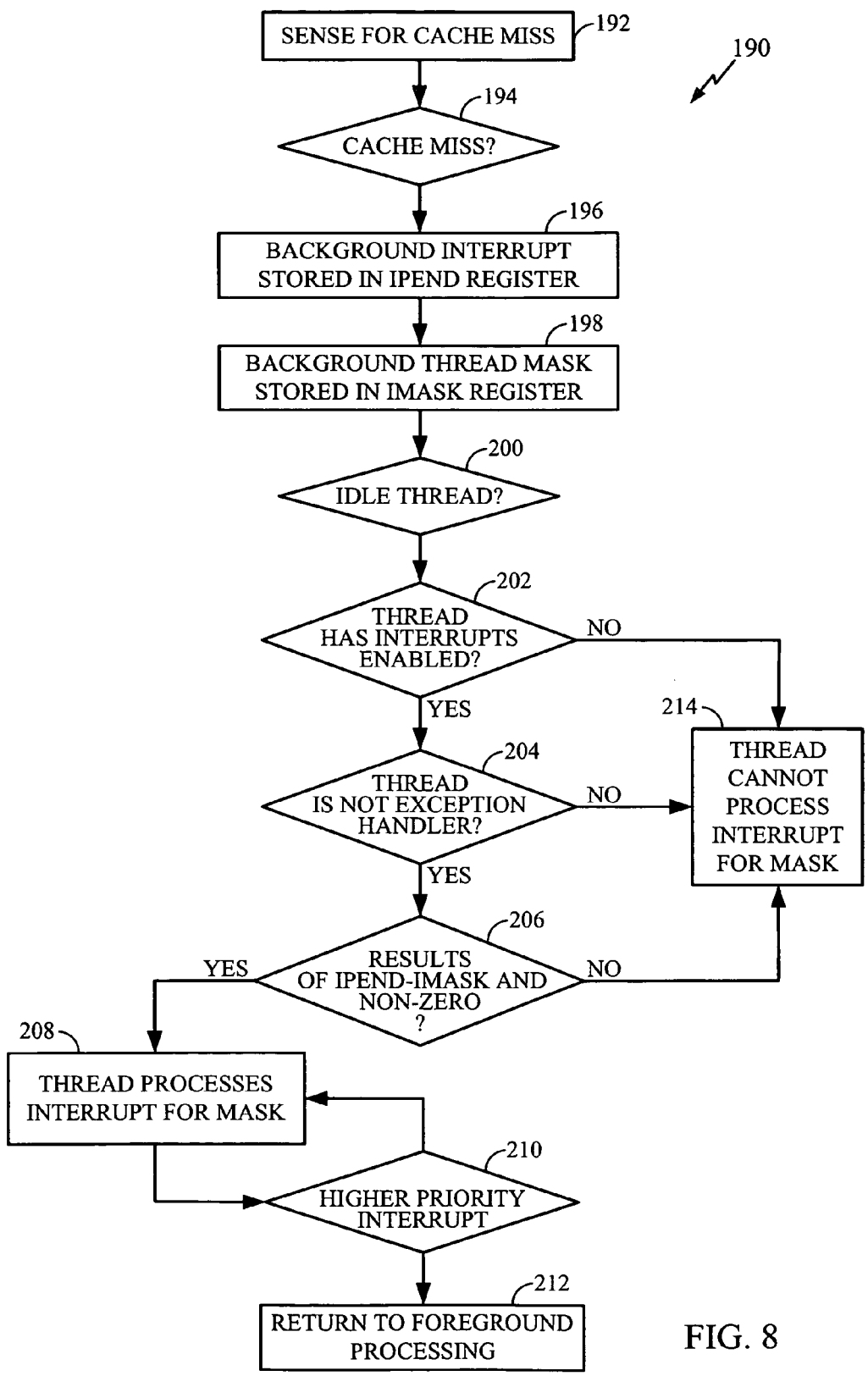

FIG. 3 provides an architecture block diagram of one embodiment of a digital signal processor providing the technical advantages of the disclosed subject matter;

FIG. 4 presents a functional block diagram of the event handling of the disclosure;

FIG. 5 shows a mask register format for use with the disclosed subject matter;

FIG. 6 presents a pending interrupt register format for use with the disclosed subject matter; and FIG. 7 provides an flowchart of the memory management functions of one embodiment of the present disclosure and with which the claimed subject matter operates; and FIG. 8 provides a flowchart of the background interrupt processing method and system of the present disclosure.

DETAILED DESCRIPTION OF THE SPECIFIC EMBODIMENTS

The disclosed subject matter for a shared background thread processing method and system for a multithread digital signal processor has application in a very wide variety of digital signal processing applications involving multi-thread processing. One such application appears in telecommunications and, in particular, in wireless handsets that employ one or more digital signal processing circuits.

Figure 1:
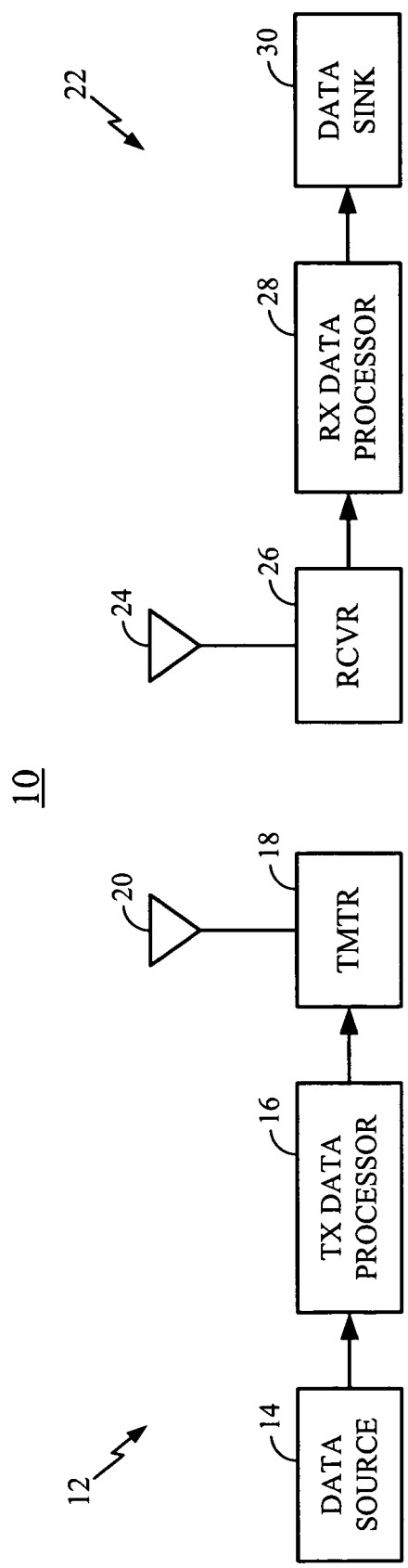
FIG. 1 is a simplified block diagram of a communications system that can implement the present embodiment.

For the purpose of explaining how such a wireless handset may be used, FIG. 1 provides a simplified block diagram of a communications system 10 that can implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
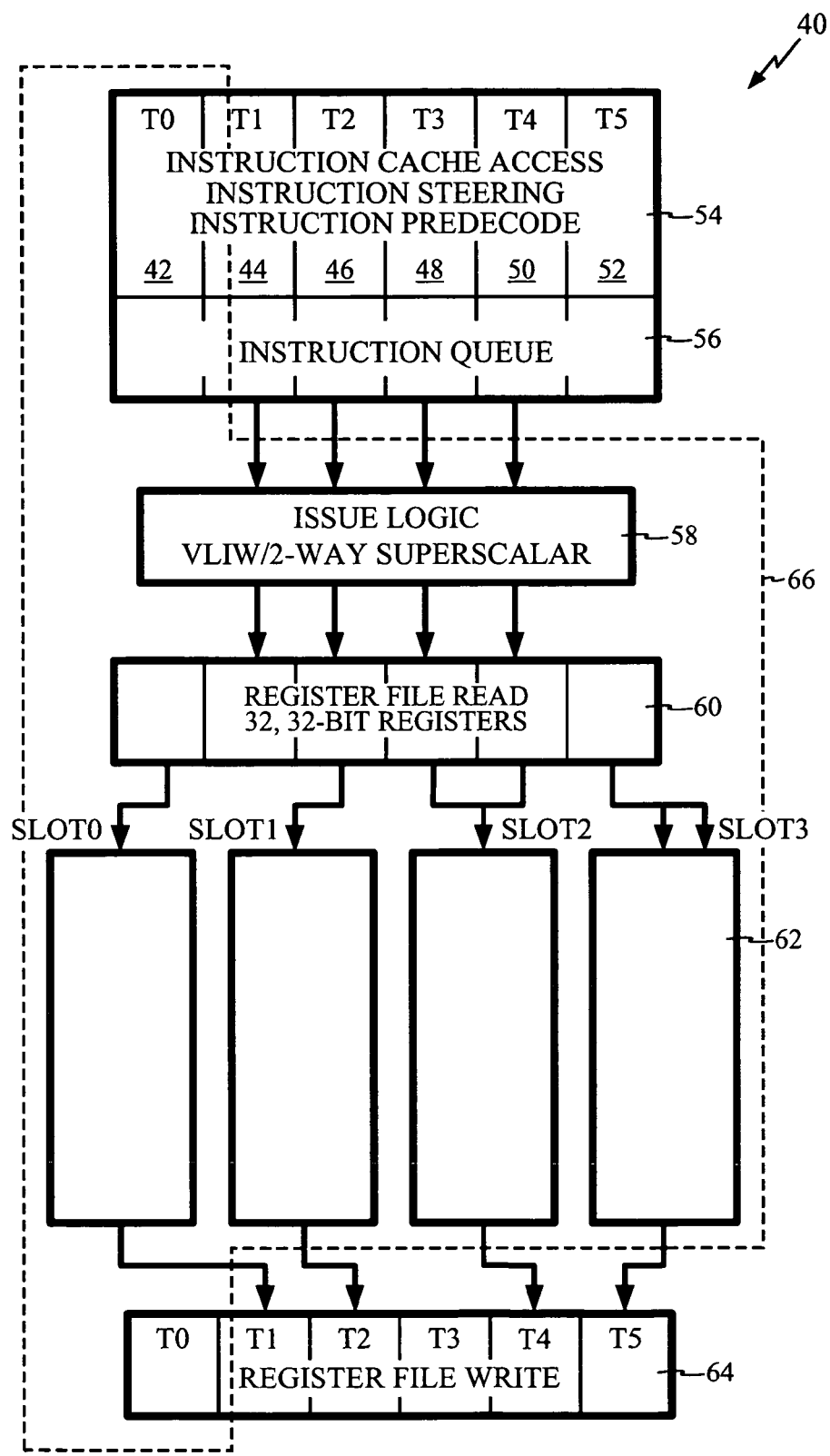
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. One more, emphasis is made that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for SLOT0 through SLOT3. SLOT0 through SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. Patent Applications by M. Ahmed, et al, and entitled "Variable Interleaved Multithreaded Processor Method and System" and "Method and System for Variable Thread Allocation and Switching in a Multithreaded Processor."

FIG. 3, in particular, provides an architecture block diagram of one embodiment of a programming model for a single thread that may employ the teachings of the disclosed subject matter, including a background thread processing control method and system for a multithread digital signal processor. Block diagram 70 depicts private instruction caches 72 which receive instructions from AXI Bus 74, which instructions include mixed 16-bit and 32-bit instructions to sequencer 76, user control register 78, and supervisor control register 80 of threads T0:T5. Sequencer 76 provides hybrid two-way superscalar instructions and four-way VLIW instructions to S-Pipe unit 82, M-Pipe unit 84, Ld-Pipe 86, and Ld/St-Pipe unit 88. AXI Bus 74 also communicates with shared data cache 90 LD/ST instructions to threads T0:T5. With external DMA master 96 shared data TCM 98 communicates LD/ST instructions, which LD/ST instructions further flow to threads T0:T5. From AHB peripheral bus 100 MSM specific controller 102 communicates interrupt pins with T0:T5, including interrupt controller instructions, debugging instructions, and timing instructions. Global control registers 104 communicates control register instructions with threads T0:T5.

FIG. 4 presents a functional block diagram of the event handling of the disclosure. In event handler architecture 110, MSM specific blocks 112 include interrupt controller block 114, debug and performance monitor block 116, and timers block 118. MSM specific blocks 110 provides sixteen (16) general interrupts 120 to global control register 122 and non-maskable interrupts (NMI) 124 to event handling register 126. Global control register 122 includes IPEND register 128, vector base register 130, mode control register 132. From IPEND Register 128, 16 interrupt types 129 may go to event handling register 126. Vector base register 130 may send 20 interrupts 131 to event handling register 126, while mode control register 132 may provide a 1×6 reset interrupt 133 to event handling register 126.

Event handling register 126 includes interrupt mask (IMASK) register 134, which provides masks data to process event register 136. Process event register 136 also receives internal exception requests, including TLB miss, error, and trap instruction requests. From global control registers 122 communications occur with general instructions registers (R0-R31) 90 and supervisor control register 80.

Therefore, interrupt processing with the disclosed subject matter includes three types of external interrupts, which include the soft reset interrupt 133, general maskable interrupts 120, 129, and 131, and the non-maskable interrupt 124. There are 16 maskable general interrupts that are shared between all the threads. When one of the 16 general interrupts 120 is raised, the corresponding bit in the global IPEND register 128 is set indicating that this interrupt is pending. Threads determine if they are able to take an interrupt by logical ANDing the global IPEND register with the local IMASK register.

The process of the disclosed subject matter may be initiated by a trigger for background interrupts, and determination of which interrupts should be raised. For this purpose, a configuration register which sets up the feature may be established. The configuration register may be a single register, for example, in which the low 16-bits indicate which interrupts should be raised. Then, the next 6 bits may be enable bits for the 6 hardware threads T0:T5. Bit 16, therefore, may indicate whether thread T0 should raise background interrupts, bit 17 may indicate whether thread Ti should raise background interrupts, and, continuing, bit 21 may indicate whether thread T5 should raise background interrupts. Of course, different initiation schemes may be used according to the needs of other design considerations. All such variations are well within the contemplation of the disclosed subject matter.

In operation, if a thread T0:T5 (a) has interrupts enabled (IE=1) and (b) is not in an exception handler (EX=0), and (c) the result of (IPEND & IMASK) is non-zero, then an interrupt can be taken by that thread. The thread is then to be qualified to take the interrupt. In the case that more than one interrupt is pending, the priority is interrupt 0 (highest priority) to interrupt 15 (lowest priority). When a global interrupt comes in and is marked in the IPEND register, any of the six hardware threads may potentially service the interrupt. Of the set of hardware threads that are qualified for the interrupt, only one in the set will take the interrupt.

An important aspect of the disclosed subject matter benefits from the randomness of the qualified threads and maskable interrupts. That is, it cannot be determined which of the qualified threads will service the interrupt, because the process and the arrival of any given type of interrupt is random. The hardware will choose a thread from the qualified set, that thread will be interrupted, and the interrupt will then be cleared from IPEND register 128 so that no further threads will service that interrupt.

The software may direct particular interrupts to particular hardware threads with appropriate IMASK register 134 programming. For example, if only hardware thread T1:T5 has the IMASK bit for interrupt 6 set, then only hardware thread T1:T5 may receive that interrupt. When an interrupt is accepted by a thread, the machine will first clear the appropriate bit in IPEND register 128. Interrupts will then be disabled for the chosen thread, the exception bit will be set to indicate the thread is now in supervisor mode, the cause field in SSR will be filled with the interrupt number, and the machine will jump to the appropriate interrupt service routine.

One embodiment of FIG. 5 shows a mask register format 140 for use with the disclosed subject matter, which includes IMASK bits 0 through 15 for containing the particular mask. Bits 16 through 31 may be reserved for the present embodiment, while permitting the establishment. Mask register 140, therefore, contains 16-bit read/write field 142 for the mask allowing software to individually mask off each of the 16 external interrupts 120 from interrupt controller 114. If a particular bit in the mask field 142 is set, then that corresponding interrupt of the 16 external interrupts 120 is enabled and will be accepted by this thread. Alternatively, if the bit is clear, then that corresponding interrupt will not be accepted.

FIG. 6 presents an example of the IPEND register format 150 for one embodiment of the disclosed subject matter. In particular, IPEND register format 150 includes reserved field 152, which may be filled in later versions and IPEND register bit field 154 for containing the general interrupt type bits. In IPEND register bit field 154, bit 0 assumes a 1 value designating the highest priority interrupt type. The lowest priority interrupt type may be designated by bit 15 assuming the value 1. There may be other ways to designate different general interrupt types, all of which are consistent with the teaching of the claimed subject matter.

In one embodiment of the claimed subject matter, a background processing interrupt, e.g., a background prefetch processing interrupt may be retrieved and provided to interrupt controller 114 as part of the memory management process.

That is during the background processing, "prefetch" instructions may be executed on behalf of the foreground process. Accordingly, FIG. 7 provides a flowchart for memory management process 160 illustrating the various memory access steps in the use of a translation lookaside buffer (TLB) for making available a background processing interrupt and performing certain actions of the disclosed background processing method and system. Memory management process 160 provides for address translation and protection, using a flat virtual address space that is translated to physical addresses via a translation lookaside buffer (TLB), the TLB supports both instruction and data accesses. User mode memory accesses are checked for proper access permissions. The TLB is software managed and may support many different operating systems and multi-threading models. Address spaces for the six threads T0:T5 in DSP 40 share a common physical address space. Each thread contains a private 6-bit ID (the Address Space Identifier, or ASID) that is pre-pended to a 32-bit virtual address to form a 38-bit tag-extended virtual address. Through MMU programming, this virtual address can be mapped to any physical address.

In one embodiment the physical address space is a 4 Gbytes, 32-bit space, 16 Mbytes of which are reserved for use by DSP 40. The location of this memory region is programmable. This region contains memory mapped registers that allow for programming specific blocks which include the interrupt controller, debugger and performance monitor, and timers. When the MMU is enabled, each address produced by a load or store instruction is referred to as a virtual address. This address is compared in parallel to all programmed entries in the TLB. A match happens when the virtual page number (VPN) of the load or store address matches an entry in the TLB, and either the global bit is set for that entry, or the ASID for that entry matches the ASID of the current thread.

In flowchart 160, upon receiving an ASID virtual address at step 162, step 164 initiates a TLB search to determine the present of a TLB match. In the case a TLB match occurs, the VPN from the load or store instruction is replaced by the physical page number from the matching entry in the TLB. The page offset portion does not pass through the TLB. If no match occurs, then memory management process 160 issues a TLB miss exception at step 166. That is, if there is no match condition, a precise TLB miss exception is taken. This enables the software to lookup the missing translation from a page table in memory and insert the missing entry in the TLB. When returning from the TLB miss exception, the instruction or packet that caused the exception is then executed again, this time with the correct translation available.

If a match does occur, processing continues to G-bit or ASID match step 168 at which such test occurs. The TLB is a shared resource between all DSP 40 threads. There are a set of global control registers for manipulating the TLB, and a set of instructions that threads can use to query and modify the TLB. When the memory management process enables the MMU and the data cache is also enabled, then the C-bits in the TLB define how load/store operations should behave. There are different types of memories that DSP 40 can access, such as cache, tightly coupled memory (TCM), I/O, etc. Each type of memory has defined behavior and possibly programming rules associated with accessing it. The supported memory types and their behaviors are discussed in this section.

Thus, if no G-bit or ASID match occurs, then, at step 170, a TLB miss exception issues. Otherwise, processing continues to step 172, which tests whether the user mode is 1 and there are no exceptions (i.e., EX=0). If not, then, at step 174, a test of whether a cacheable instruction exits. If so, then, at step 176 a cache access occurs. Otherwise, processing continues to step 178, at which a test of whether necessary fetch, load, and writer permissions exist. If so, then processing returns to step 174 to determine whether the instruction is cacheable. Otherwise, processing continues to step 180 whereupon memory management process 160 issues a privilege violation exception.

DSP 40 supports tightly-coupled memory (TCM) for data accesses. To indicate that a load or store is intended for TCM, the cache attribute bits in the MMU entry may be set to TCM. Program fetches and load/store operations which are allowed to operate from cache memory are referred to as cached accesses. Cacheable instruction fetches are handled by an instruction cache (Icache). There are six 4 Kbyte instruction caches in one embodiment of DSP 40 that are private to each thread. Data loads and stores are held in a shared 32 Kbyte data cache. Thus, at step 170, memory management process 160 determines that a cacheable instruction does not exist, then processing goes to step 182 which tests whether TCM access may occur. If so, processing goes to step 184 for accessing TCM. Otherwise, process flow goes to step 186 whereupon memory management process 160 bypasses cache memory to access external memory.

If a cache miss or other predetermined event of similar type occurs, the present embodiment provides for background processing using an idle thread. Such process may preferably accomplish a prefetch operation, for example, to reduce memory latency. Therefore, FIG. 8 provides background processing flow diagram 190 for illustrating certain novel functions of the disclosed subject matter for background processing using one of threads T0:T5 in response to background processing interrupt type. Flow diagram 190 begins as step 192, at which point background processing senses for a cache miss or other predetermined event for which background processing would be advantageous. At query 194, if a cache miss occurs, processing continues to step 196, at which a background interrupt is stored in IPEND register 128. Also, a background processing mask may be stored in IMASK Register 134. Interrupt controller 114 may provide a background processing interrupt as one of the 16 general interrupt types 120 to IPEND register 128 of general control register 122. At step 198, IMASK register 134 may store the background processing interrupt for associating with the various threads T0:T5 of DSP 40. Thus, with IPEND containing the background processing register and IMASK register 134 potentially storing a corresponding background processing mask, flow diagram 190 first determines whether an idle thread exists at query 200. If so, then process 190 determines whether thread interrupt processing is enabled for the particular idle thread at query 202. Then, at query 204, the process determines that the particular thread is not operating as an exception handler.

At query 206, after taking the logical AND of IPEND register 128 and IMASK register 134 a test of whether the result is non-zero occurs, thereby determining a match between the background processing register of IPEND register 128 and the background processing mask of IMASK register 134 exists. If a non-zero result occurs, then flow continues to step 208 at which the particular thread processes an interrupt corresponding to the particular mask. If the tests of any of queries 202, 204, or 206 fails, then processing goes to step 214 at which process flow 160 determines that the thread cannot process the interrupt(s) being examined. Otherwise, as stated, background thread processing may occur. This may continue until, as query 210 indicates, until a higher priority interrupt for which a processing thread T0:T5 may be useful arises. If such an interrupt arises, then process flow goes to step 212, at which foreground processing using the particular thread may resume.

Background processing flow diagram 190, therefore, provides a method and system for operation in association with DSP 40 for processing interrupts that includes a background thread interrupt for operation as one of a plurality of interrupt types. The background thread interrupt initiates a background process using one of a plurality of processing threads of a multithread DSP 40. The IPEND interrupt register 128 may store the background thread interrupt. A background processing mask associates with one of processing threads T0:T5 of DSP 40. IMASK register 134 associates the background processing mask with at least a subset of the plurality of processing threads. Event sensing instructions 192 sense the presence of a predetermined event in one of the plurality of processing threads during multithread processing of DSP 40. Interrupt issuing instructions 206 associate with IPEND register for issuing the background thread interrupt in response to the predetermined event.

Background processing circuitry initiates background processing using one of the subset of the plurality of processing threads having an associated background process mask. Thread interrupt forming instructions form the background thread interrupt as a data element of a translation lookaside buffer associated with DSP 40. The thread interrupt forming instructions change the data element of the translation lookaside buffer according to varying operations on the DSP 40. Thread selection circuitry and instructions select the idle processing threads as the processing threads for background processing.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

According to further embodiments, a computer usable medium is provided. The computer usable medium comprises a non-transitory storage medium having computer readable program code means embodied therein. The program code means is operable, when executed by a computer, to cause the computer to execute instructions or otherwise perform methods in accordance with the present disclosure, such as background processing in a multithreaded digital signal processor.

What is claimed is:

1. A method of performing background processing in a multithreaded digital signal processor comprising a plurality of processing threads, said method comprising:
    forming a background thread interrupt as one of a plurality of interrupt types, said background thread interrupt to initiate a background process using one of a plurality of processing threads of said multithreaded digital signal processor;
    storing said background thread interrupt in an interrupt register;
    forming a background processing mask; and associating said background processing mask with at least a subset of said plurality of processing threads;
    sensing a predetermined event in an active thread of said plurality of processing threads during processing of said multithreaded digital signal processor;
    issuing said background thread interrupt from said interrupt register in response to said predetermined event;
    initiating background processing using an idle thread of said subset of said plurality of processing threads having an associated background process mask, wherein said multithreaded digital signal processor is operable to support concurrent execution of two or more of said plurality of processing threads;
    storing said background thread interrupt as a background prefetch interrupt;
    forming said background processing mask as a background prefetch processing mask; and
    initiating said background processing as background prefetch processing.

2. The method of claim 1, further comprising:
    forming said background thread interrupt as a low-priority thread interrupt to perform low-priority background processing using said idle thread; and
    issuing said low-priority thread interrupt upon the occurrence of said predetermined event.

3. The method of claim 1, further comprising:
    sensing of a cache miss as said predetermined event in said active thread of said plurality of processing threads during processing of said digital signal processor; and
    issuing said background thread interrupt from said interrupt register in response to said cache miss.

4. The method of claim 1, further comprising forming said background thread interrupt as a data element of a translation lookaside buffer associated with said digital signal processor.

5. The method of claim 4, further comprising changing said data element of said translation lookaside buffer according to varying operations on said digital signal processor.

6. The method of claim 1, further comprising selecting said idle thread of said subset of said plurality of processing threads to service said background thread interrupt.

7. The method of claim 1, further comprising performing said background processing during interleaved multithreaded operation of said plurality of processing threads.

8. The method of claim 1, further comprising terminating said background processing in said idle thread upon said interrupt register issuing an interrupt having a higher priority than said background processing interrupt.

9. A system to operate in association with a multithreaded digital signal processor to process interrupts, the system comprising:
    a multithreaded digital signal processor;
    a background thread interrupt to operate as one of a plurality of interrupt types, said background thread interrupt to initiate to initiate a background process using one of a plurality of processing threads of said multithreaded digital signal processor;
    an interrupt register to store said background thread interrupt;
    a mask register to associate a said background processing mask with at least a subset of said plurality of processing threads;
    event sensing instructions to sense a predetermined event in an active thread of said plurality of processing threads during processing of said multithreaded digital signal processor;

interrupt issuing instructions associated with said interrupt register to issue said background thread interrupt from said interrupt register in response to said predetermined event; and background processing circuitry to initiate background processing using an idle thread of said subset of said plurality of processing threads having an associated background process mask, wherein said multithreaded digital signal processor is operable to support concurrent execution of two or more of said plurality of processing threads;

circuitry and instructions associated with said interrupt register to store said background thread interrupt as a background prefetch interrupt;

circuitry and instructions associated with said mask register to form said background processing mask as a background prefetch processing mask; and background processing circuitry and instructions to initiate said background processing as background prefetch processing.

10. The system of claim 9, further comprising:
processing instructions and circuitry to form said background thread interrupt as a low-priority thread interrupt to perform low-priority background processing using said subset of said plurality of processing threads; and
issuing instructions associated with said interrupt register for issuing to issue said low-priority thread interrupt upon the occurrence of said predetermined event.

11. The system of claim 9, further comprising:
event sensing circuitry and instructions to sense a cache miss as said predetermined event in said active thread of said plurality of processing threads during processing of said digital signal processor; and
interrupt issuing circuitry and instructions to issue said background thread interrupt from said interrupt register in response to said cache miss.

12. The system of claim 9, further comprising thread interrupt forming instructions to form said background thread interrupt as a data element of a translation lookaside buffer associated with said digital signal processor.

13. The system of claim 12, wherein said thread interrupt forming instructions further comprise instructions to change said data element of said translation lookaside buffer according to varying operations on said digital signal processor.

14. The system of claim 13, further comprising thread selection circuitry and instructions to select said idle thread of said subset of said plurality of processing threads to service said background thread interrupt.

15. The system of claim 9, wherein said processor further comprises processing instructions to perform said background processing during interleaved multithreaded operation of said plurality of processing threads.

16. The system of claim 9, wherein said processor further comprises processing circuitry and instructions to terminate said background processing in said idle thread of said subset of said plurality of processing threads upon said interrupt register issuing an interrupt having a higher priority than said background processing interrupt.

17. A multithreaded digital signal processor to operate in support of a personal electronics device, said multithreaded digital signal processor comprising means for performing background processing, said background processing means comprising:
means for forming a background thread interrupt as one of a plurality of interrupt types, said background thread interrupt for initiating a background process using one of a plurality of processing threads of a multithreaded digital signal processor;
means for storing said background thread interrupt in an interrupt register;
means for forming a background processing mask; and
means for associating said background processing mask with at least a subset of said plurality of processing threads;
means for sensing a predetermined event in an active thread of said plurality of processing threads during processing of said multithreaded digital signal processor;
means for issuing said background thread interrupt from said interrupt register in response to said predetermined event; and
means for initiating background processing using an idle thread of said subset of said plurality of processing threads having an associated background process mask, wherein said multithreaded digital signal processor is operable to support concurrent execution of two or more of said plurality of processing threads;
means for storing said background thread interrupt as a background prefetch interrupt;
means for forming said background processing mask as a background prefetch processing mask; and
means for initiating said background processing as background prefetch processing.

18. The multithreaded digital signal processor of claim 17, further comprising:
means for forming said background thread interrupt as a low-priority thread interrupt for performing low-priority background processing using said idle thread of said subset of said plurality of processing threads; and
means for issuing said low-priority thread interrupt upon the occurrence of said predetermined event.

19. The multithreaded digital signal processor of claim 17, further comprising means for forming said background thread interrupt as a data element of a translation lookaside buffer associated with said multithreaded digital signal processor.

20. The multithreaded digital signal processor of claim 19, further comprising means for changing said data element of said translation lookaside buffer according to varying operations on said multithreaded digital signal processor.

21. The multithreaded digital signal processor of claim 17, further comprising means for selecting said idle thread of said subset of said plurality of processing threads to service said background thread interrupt.

22. The multithreaded digital signal processor of claim 17, further comprising means for performing said background processing during interleaved multithreaded operation of said plurality of processing threads.

23. The multithreaded digital signal processor of claim 17, further comprising means for terminating said background processing in said idle thread of, said subset of said plurality of processing threads upon said interrupt register issuing an interrupt having a higher priority than said background processing interrupt.

24. A non-transitory computer usable medium having computer readable program code means embodied therein to perform background processing in a multithreaded digital signal processor, the computer usable medium comprising:
computer readable program code means for forming a background thread interrupt, said background thread interrupt for initiating a background process using one of a plurality of processing threads of said multithreaded digital signal processor;

computer readable program code means for storing said background thread interrupt in an interrupt register;
computer readable program code means for associating a background processing mask with at least one of said plurality of processing threads;
computer readable program code means for sensing an event in an active thread of said plurality of processing threads during processing of said multithreaded digital signal processor;
computer readable program code means for identifying a subset of said plurality of processing threads of said multithreaded digital signal processor, wherein the subset of said plurality of processing threads is limited to include threads that are eligible to service said background thread interrupt and that are in an idle state;
computer readable program code means for issuing said background thread interrupt from said interrupt register in response to said event;

computer readable program code means for initiating background processing using an idle thread of said subset of said plurality of processing threads, the idle thread having an associated background process mask, wherein said multithreaded digital signal processor is operable to support concurrent execution of two or more of said plurality of processing threads;
computer readable program code means for storing said background thread interrupt as a background prefetch interrupt;
computer readable program code means for forming said background processing mask as a background prefetch processing mask; and
computer readable program code means for initiating said background processing as background prefetch processing.

* * * * *